US010572927B2

(12) United States Patent
Abramowitz

(10) Patent No.: US 10,572,927 B2
(45) Date of Patent: Feb. 25, 2020

(54) METHOD AND MEDIUM FOR CUSTOMIZED PERSONAL CARE MANAGEMENT

(71) Applicant: Rachel Abramowitz, New York, NY (US)

(72) Inventor: Rachel Abramowitz, New York, NY (US)

(*) Notice: Subject to any disclaimer, the term of this patent is extended or adjusted under 35 U.S.C. 154(b) by 670 days.

(21) Appl. No.: 15/200,681

(22) Filed: Jul. 1, 2016

(65) Prior Publication Data

US 2017/0004558 A1     Jan. 5, 2017

Related U.S. Application Data

(60) Provisional application No. 62/188,167, filed on Jul. 2, 2015.

(51) Int. Cl.
*G06Q 30/00* (2012.01)
*G06Q 30/06* (2012.01)

(52) U.S. Cl.
CPC ............................ *G06Q 30/0631* (2013.01)

(58) Field of Classification Search
CPC .................................................. G06Q 30/0631
See application file for complete search history.

(56) References Cited

U.S. PATENT DOCUMENTS

| 2003/0014324 | A1* | 1/2003 | Donovan | A61K 8/02 705/26.43 |
| 2006/0265244 | A1* | 11/2006 | Baumann | G06Q 30/02 705/2 |
| 2010/0088148 | A1* | 4/2010 | Presswala | G06Q 30/02 705/7.29 |
| 2014/0154789 | A1* | 6/2014 | Polwart | G01N 21/8483 435/287.2 |

OTHER PUBLICATIONS

Evans, Amber O. Investigation of the interaction between water hardness metals and human hair. Diss. University of Cincinnati. (Year: 2011).*

* cited by examiner

*Primary Examiner* — Matthew E Zimmerman

(57) ABSTRACT

This application is related to a system and related methods for providing a user with a hair product based on the user's hair type, location, water characteristics associated with a location or water used when applying the hair products, and/or other factors. The system develops various databases, including data indicating global environment conditions at the city, state, and/or regional level, and chemical ingredients that achieve specific hair effects. Upon receiving a request from a user specifying at a desired hair result, the system determines a hair product for the user based on water hardness, and recommends a hair product or sends the user a hair product in accordance with the user's desired hair effects.

6 Claims, 12 Drawing Sheets

| Hair Effects by Natural Phenomena ||
|---|---|
| Phenomena <br> 312 | Hair Effects <br> 314 |
| Sun/high temperature | Reduces strength, shine, and volume |
| Cold | Reduces moisture and smoothness |
| Rain | Reduces smoothness and straightness |
| Wind | Reduces smoothness and producing hair breakage |
| Hard water | Reduces smoothness and softness |

*FIG. 3C*

| Hair Effects by Natural Ingredients ||
|---|---|
| Ingredient <br> 316 | Hair Effects <br> 318 |
| Carnitine | Thickness, loss prevention |
| Coenzyme Q | Shine, smoothness |
| Ginseng root extract | Breakage prevention |
| Glycerol | Moisture |
| Jojoba oil | Smoothness, breakage repair |
| Caffeine | Loss prevention |
| Olive oil | Smoothness, shine |
| Sesame oil | Thickness |

| Basic | Hair | Profiles |

- Hair type: [　　　　　▼]
- Default desired hair effects:

☐ softening　　☐ thickening
  ☐ shine　　　　☐ volume
  ☐ loss prevention　☐ breakage healing Others: [　　　　　　　]

- Hair products in use: [　　　　　　]
- Hair wash frequency: [　　　　　▼]
- Hair coloring frequency: [　　　　　▼]
- Hair perming frequency: [　　　　　▼]
- Submitting hair sample? ☐
- Submitting hair test result? ☐
- Default hair product retailer:

Address [　　　　　　　　]
  City [　　　] State [　] Zip [　　　]
  Country [　　　　　▼]

- Default hair salon:

Address [　　　　　　　　]
  City [　　　] State [　] Zip [　　　]
  Country [　　　　　▼]

Save　　Cancel

| Basic (602) | Hair (604) | Profiles (606) | 675 |

Search profile [            ]
(Please enter dates, keywords, etc.)
New profile [ Submit ]

Profile No. 5
- Destination address     Use home address? ☐
  - Address 1 [            ]
  - Address 2 [            ]
  - City [    ] State [  ] Zip [    ]
  - Country [ ▼ ]
- Duration of stay
- Repeat: [ ▼ ]
  - Begin [    📅] End [    📅]
- Submitting water sample? ☐
- Requesting free water test kit? ☐
- Submitting water test result? ☐
- Desired hair effects for destination    Use default? ☐
  - ☐ softening    ☐ thickening
  - ☐ shine        ☐ volume
  - ☐ loss prevention  ☐ breakage healing
  - Others: [            ]

- - - - - - - - - - - - - - - - - - - - - - - - -

- Delivery address   Use home address? ☐   Use destination address? ☐
  - Address 1 [            ]
  - Address 2 [            ]
  - City [    ] State [  ] Zip [    ]
  - Country [ ▼ ]
- Delivery date  before [    📅]
- Preferred delivery method: [ ▼ ]

[ Save ]   [ Cancel ]

Customized Hair Report & Care Instructions

- Name: Jane P. Smith
- Hair characteristics:

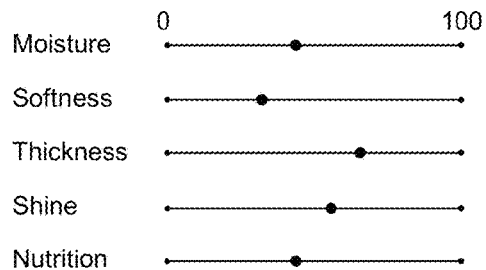

- Destination: London, UK
- Duration: 04/15/15 ~ 07/15/15
- Desired hair effects
  — Softness
  — Breakage repair
  — Loss prevention

- Recommended hair products

Custom made

- Price = $60
- Size: 3 oz.
- Ingredients:
  - Scent = orchis mascula flower extract
  - Softness: sodium hexametaphosphate
  - Breakage repair: ceramide
  - Loss prevention: carnitine
- Instructions: Wash hair every two days.

Available in stores

- Name: Pefect Hair Shampoo
- Price = $30
- Size: 8 oz.
- Ingredients:
  - Softness: sodium borate
  - Moisture: coconut oil
  - Shine: botanical silk
- Instructions: Wash hair five days a week.
- Sources:
  Personal Care Station
  226 487$^{th}$ St.
  New York, NY 01234
  646-497-XXXX

- Recommended hair services
  - Location:
    Sommer Salon
    XXX Hoxton St.
    London, United Kingdom
    +44 20 3417 XXXX
  - Services: Softening
  - Price: $200

*FIG. 7*

METHOD AND MEDIUM FOR CUSTOMIZED PERSONAL CARE MANAGEMENT

CROSS-REFERENCE TO RELATED APPLICATION

The present application claims priority to and benefit from U.S. Provisional Patent Application No. 62/188,167 titled "CUSTOMIZED PERSONAL CARE MANAGEMENT BASED ON WATER QUALITY AND OTHER ENVIRONMENTAL FACTORS," filed on Jul. 2, 2015, the entire content of which is herein expressly incorporated by reference for all purposes. To the extent the foregoing application and/or any other materials incorporated herein by reference conflict with the present disclosure, the present disclosure controls.

TECHNICAL FIELD

This application is generally related to personal care products and, specifically, to recommending a hair product to a user based on water hardness for a water source.

BACKGROUND

Many water sources that are used by consumers for personal care contain elevated levels of water hardness. As a result of applying these water sources to hair, hair can become brittle, straw-like, dull, limp, and/or other negative effects. Accordingly, there is a need for a system or method that reduces the negative effects of water hardness on hair. Although a filter can reduce the water hardness level in a water source, filters are expensive, costly to replace, and may not be effective in reducing water hardness.

BRIEF DESCRIPTION OF THE DRAWINGS

FIG. 3C illustrates an example catalog of hair effects produced by natural phenomena.

FIG. 3D illustrates an example table of chemical ingredients that produce desired hair effects.

FIG. 6A illustrates an example screen for inputting basic user information.

FIG. 6B illustrates an example screen for inputting hair-related user information.

FIG. 6C illustrates an example screen for managing user profiles, each corresponding to one destination.

FIG. 7 illustrates an example hair report produced by the customized care system for a user in response to the user's request for hair solutions.

DETAILED DESCRIPTION

Figure 1:
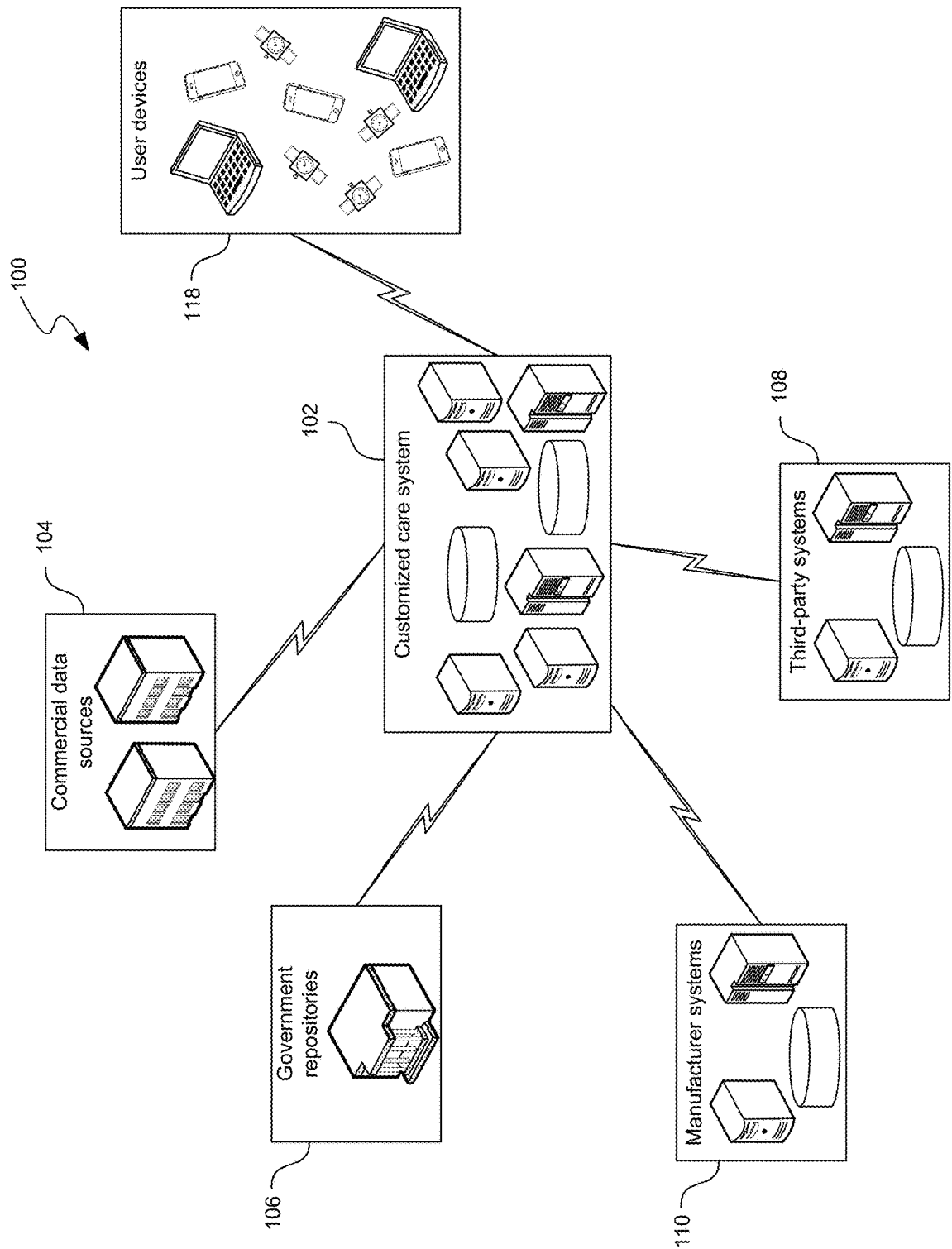
FIG. 1 illustrates an example computing environment in which a customized care system can operate.

This application is generally related to systems and methods for recommending or providing a hair product to a user. In some embodiments, the system recommends or provides a hair product based on water hardness of a water source. A water source can be a shower, bath, sink, or other water dispensing device used with a hair product. Depending on the hardness of a water source, the system may provide a hair product with different levels of detergent and soap, or mix other ingredients into a recommended hair product to reduce the negative effects (e.g., dull, limp) of water hardness on hair. For example, in high levels of hard water (e.g., 120 ppm or more), soap reacts with calcium to form soap scum, and more soap (e.g., lard) will remove the scum. As another example, more sodium hydroxide can be added to a hair product composition if the hair product is intended for use in a high water hardness.

Alternative to adjusting the chemistry of a hair product, the system can recommend hair product provided by a third party that is configured to reduce the negative effects of water hardness on hair. The system can store an identifier (e.g., name, serial number) of several hair products available to a user and store the chemical formula associated with the hair products. Based on a water hardness level of a water source supplied by the user, the system can filter through the database to determine a hair product that reduces the negative effects water hardness of a user's hair. The system can recommend one or several hair products configured to reduce the negative effects of water hardness on a user's hair. As an example, the system can access a list of 100 (or more) shampoos and associated chemical formulas, and the system can filter this list based on how the chemical formulas (e.g., amount of acid, base, salt) can interact with minerals in water. Based on sorting the list, the system can recommend the three shampoos that best match a user's hair type, water source water hardness, and desired hair appearance.

The system also enables a user to supply results of self-administered local water source test to assist in recommending a hair product. In some embodiments, the system may manage data regarding water hardness testing kits. Companies or third parties that develop the customized hair product may send the self-administered local water source tests for sampling environmental material to the potential customers or users of the customized product. For example, a promotional testing kit may include litmus paper or other chemical paper that reacts with water to determine the chemical properties of the water source (e.g., concentration of carbon dioxide ($CO_2$), pH, and other common water properties). In such an example, the user or potential customer may place litmus paper from the promotional testing kit in a water source (e.g., a sink or shower). After the litmus paper is placed in the water source, the user may send the promotional testing kit with its results from the litmus paper test to a designated address. Alternatively, the user can photograph the results (e.g., with a smartphone) and electronically send the results to the system or other vendor systems. The results and corresponding analysis can then be used to determine a customized product. For example, if the promotional testing kit includes a litmus test that reveals a high concentration of magnesium (e.g., hard water), then the formula of the customized hair product may be adjusted to include magnesium-removing chemicals (e.g., lime, calcium hydroxide ($Ca(OH)_2$), sodium carbonate ($Na_2CO_3$), and/or similar water-softening chemicals). Also, instead of adjusting the formula of the customized hair product, the system may recommend a hair product or solution based on the testing kit results.

Moreover, the system may manage the distribution or advertising of products based on water hardness conditions where hair products are used (e.g., sold). In other words, the system can determine the water hardness in a city, state, or region based on government water hardness data. Based on the data, the system can instruct a hair care provider to provide hair product with a chemical composition designed to reduce the negative effects of water hardness in particular regions.

Through a graphical user interface (GUI), a user can submit a request to the system for a hair product. The request can also include information about the user's hair type, desired hair effects, and mechanisms for receiving desired hair products. As a result, the user receives, via the GUI, a report instructing the user how to obtain the desired hair products or services specifically designed or identified for the user. The report can also include an analysis of the user's hair condition and of the effects on hair by the environmental factors such as humidity in the user environment (e.g., user's location).

There are several expected advantages to the disclosed system. First, the system customizes a user's experience by matching recommended hair products with a user's environment (e.g., water hardness). Second, the user can easily send information related to water hardness of a water source without having to contact water source authorities. Other advantages will be apparent to those having ordinary skill in the art when reading this Detailed Description.

Various implementations of the system will now be described. The following description provides specific details and an enabling description of these implementations. One skilled in the art will understand, however, that the system may be practiced without many of these details. Additionally, some well-known structures or functions may not be shown or described in detail so as to avoid unnecessarily obscuring the relevant description of the various implementations. The terminology used in the description presented below is intended to be interpreted in its broadest reasonable manner, even though it is being used in conjunction with a detailed description of certain specific implementations of the system.

Illustrative Environment

FIG. 1 illustrates an example computing environment 100 in which a customized care system can operate. The computer environment 100 comprises customized care system 102, commercial data sources 104, local government repositories 106, manufacturer systems 110, third-party system 108, and user devices 118. User devices 118 can be a desktop computer, a mobile phone, a laptop computer, a tablet, or a wearable device such as a smartwatch, etc. User devices 118 communicate over network(s) (not shown) with customized care system 102, commercial data sources 104, local government repositories 106, manufacturer systems 110, and third-party system 108. The customized care system 102, commercial data sources 104, local government repositories 106, manufacturer systems 110, and third-party system 108 can be single servers or may be part of a distributed computing environment encompassing multiple servers located at the same or at geographically disparate physical locations. Those skilled in the relevant art will further recognize that certain portions of the customized care system 102 may reside on one or more systems, while other portions reside on the user devices 118.

In general, the customized care system 102 communicates with various data sources to collect data regarding environmental conditions, such as water hardness, at the city, state, and/or regional level. The data sources can include government databases and other public and private repositories (e.g., commercial data sources 104 or government repositories 106). The customized care system 102 also communicates with user devices 118, such as mobile phones, tablets, and wearable devices, to receive requests from users for hair solutions, to send hair reports, and to receive instructions in response to the requests. In addition, the system communicates with third-party systems 108, which can be vendors, research centers, and others in determining and preparing the hair solutions. The third-party systems 108 can include testing labs that test hair, water, and other samples; chemical analysis facilities that determine various formulae that would achieve specific hair effects; etc. The vendors can include hair product manufacturers, hair product sellers, hair service providers, hospitality service providers, and delivery companies. The system can also be merged into one of these various systems.

As shown in FIG. 1, manufacturer systems 110 are businesses that provide hair products. The manufacturer systems 110 make hair products such as shampoo and conditioner. Additionally, the manufacturer systems 110 can modify hair products. For example, the manufacturer systems 110 can increase or decrease the amount of soap or other ingredient in a hair product to achieve a desired result. As an example, the customized care system 102 can send instructions to the manufacturer systems 110 to adjust a formula of a customized hair product may to include magnesium-removing chemicals (e.g., lime, calcium hydroxide ($Ca(OH)_2$), sodium carbonate ($Na_2CO_3$), and/or similar water-softening chemicals) in response to a user's request for a hair product that reduces effect of water hardness on a user's hair.

Customized Care System

Figure 2:
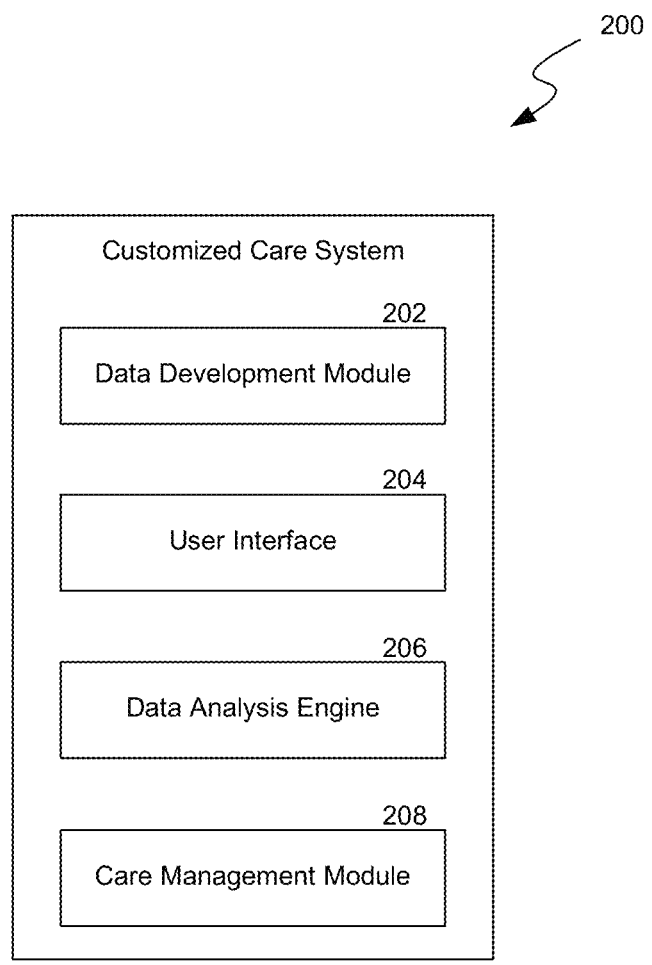
FIG. 2 illustrates example components of the customized care system.

FIG. 2 is a block diagram illustrating an overview block diagram of the customized care system 102 shown in FIG. 1. The customized care system 102 stores software comprising one or more modules. The modules perform certain methods or functions of the customized care system 102 described herein and can include components, subcomponents, or other logical entities that assist with or enable the performance of some or all of these methods or functions. As shown in FIG. 2, the customized care system 102 comprises a data development module 202, user interface 204, a data analysis engine 206, and a care management module 208, each of which will be described in more detail below.

The data development module 202 develops various databases based on data acquired from various data sources. As described below, data sources can include water testing paper such as those described in FIG. 4. Data sources can also include publically available water records. For example, the U.S. Environmental Protection Agency (EPA) publishes reports on water hardness and other water conditions (e.g., alkalinity) in the United States. The data development module 202 may also use a combination of database information to determine local water hardness level (e.g., EPA reports, user input, and zip code) and other environmental factors.

The user interface 204 handles interactions with user devices. As a broad overview, the user interface module 204 receives user information (e.g., via a mobile device touchscreen or laptop screen) and prompts the user for information. The user interface module 204 can ask the user questions about user hair type (e.g., curly, straight, oily, and/or thin) and desired hair results (e.g., clean, thick, shiny, and/or smooth). The user interface 204 can also ask the user for information related to the user's location, preferred hair product, and/or previous experience with another hair product.

The data analysis engine 206 communicates with research center systems to analyze user-supplied data, together with data in the various databases, and subsequently determine appropriate care regimes for users. The data analysis engine 206 may also factor in user input. For example, if a user knows that a water filtration system is used for a water source, then the data analysis engine 206 may be able to estimate the water source to have a relatively low hardness. However, if the user inputs information that the water source is in a location with known high water hardness (e.g., from a well or rusty pipes), then the data analysis engine 206 may determine that the water hardness level is likely high.

The care management module 208 communicates with various manufacturers and service provider systems to collect data regarding hair products. Third parties create hair products and advertise these products online, with TV, and/or by other means. The care management module 208 collects data on every hair product available. Some of the data that it collects is related to the information stored in the tables FIGS. 3A-3D.

Figure 3A:
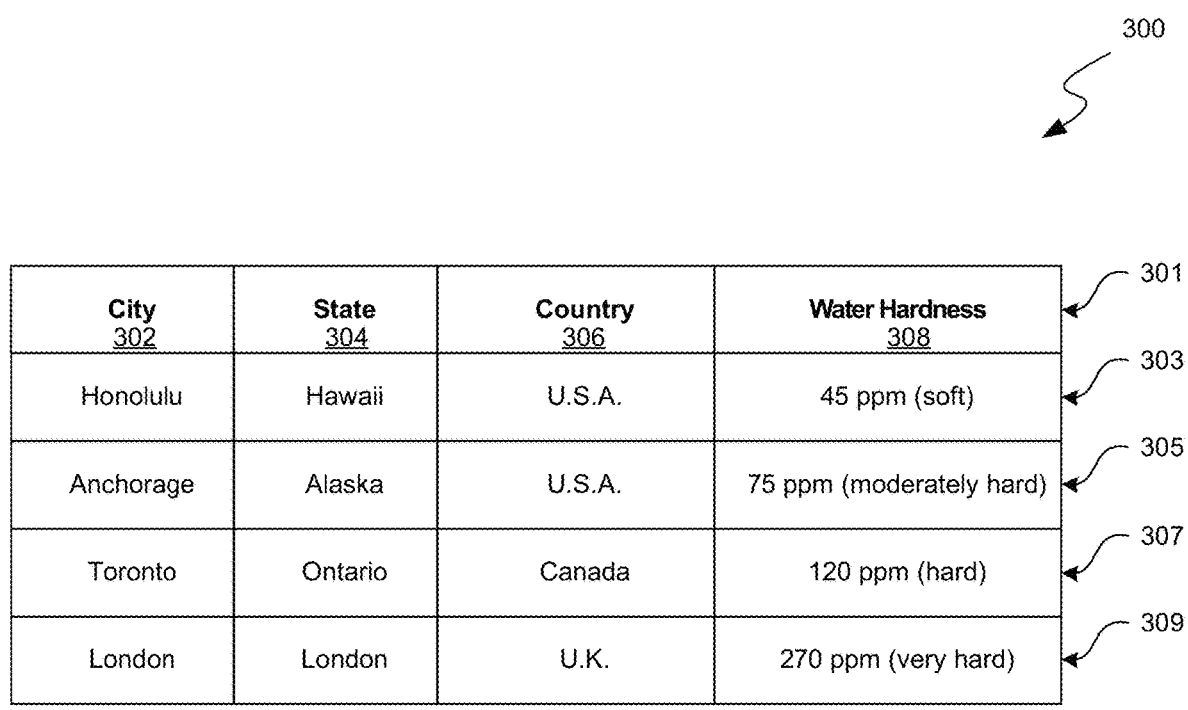
FIG. 3A illustrates an example table, including information related to water hardness at the city, state, and/or regional level.

FIGS. 3A-3D are representative data tables developed and maintained by the customized care system 102. FIG. 3A illustrates an example table 300 of water hardness at the city, state, and/or regional level. As shown in FIG. 3A, water hardness can be expressed in parts per million (ppm) for each region, but it can also be expressed in other units such as mol/L, mmol/L, mg/L. In general, water hardness is a significant factor in environmental conditions for the hair product. Furthermore, concentrations of iron ($Fe^{+2}$ or $Fe^{+3}$), aluminum ($Al^{+3}$), manganese ($Mn^{+2}$ or $Mn^{+3}$), or other cations can also be accounted for in hardness.

Figure 3B:
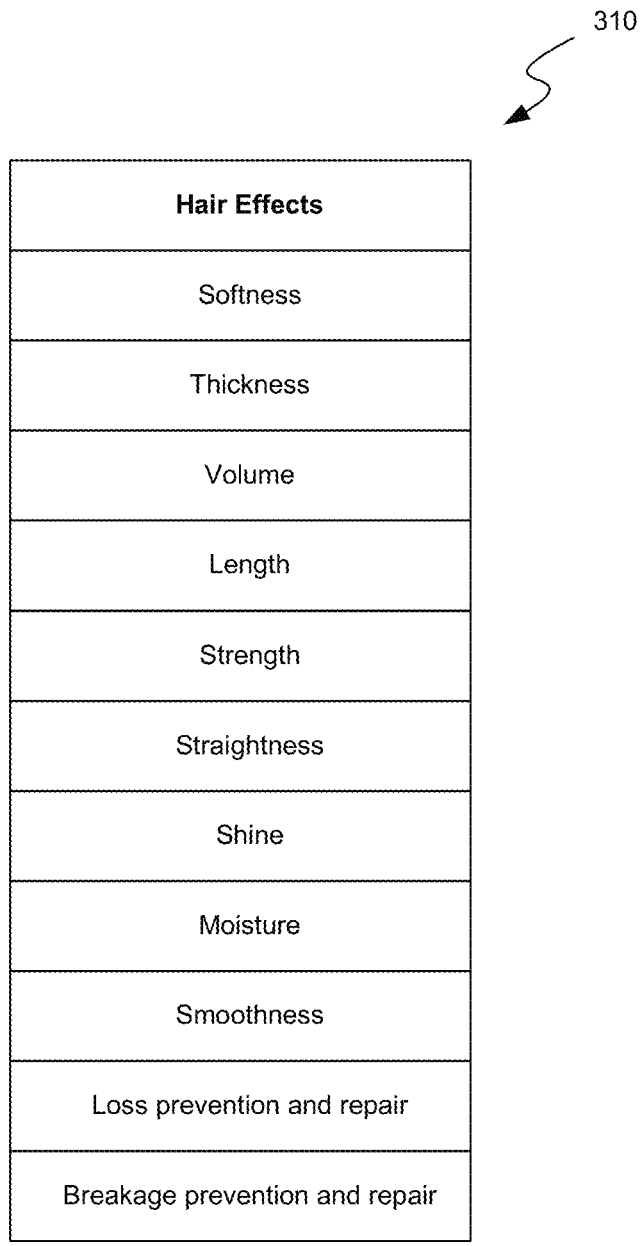
FIG. 3B illustrates an example catalog of hair effects that may be desired by a user.

FIG. 3B illustrates an example catalog of hair effects 310 that may be desired by a user. FIG. 3C illustrates an example catalog of hair effects 314 produced by natural phenomena 312. FIG. 3D illustrates an example table of ingredients 316 that produce desired hair effects 318. Additional databases can include data regarding other data cataloging interactions among chemical ingredients, hair sample test and analysis results, and so on. These databases enable the customized care system 102 to identify relevant environmental conditions for the user's combination of time and location, determine the negative effects of those environmental conditions, further determine how to undo the negative effects, and generate hair solutions that produce desired hair effects for the user. Table 1 below is an example of effects on hair for varying hair and water types that can be stored in a database. Also, Table 1 explains how to adjust the chemistry of a shampoo to counteract negative effects of water hardness.

TABLE 1

| Hair type | Soft water (e.g., low concentration of calcium or magnesium) | Hard water (e.g., moderate levels of calcium or magnesium) | Very hard water (e.g., high levels of calcium or magnesium) |
|---|---|---|---|
| Straight | Limp hair, limited volume, good shine | Dry texture with limited shine | Dry hair that lacks shine, but has volume due to minerals |
| Curly | Great curl formation with limited frizz | Frizz and lack of shine | Dry hair with frizz and no shine |
| Colored (Dyed) | Color is vibrant and long lasting | Often need to reformulate to match color; certain colors like red are not vibrant and fade within weeks | Colors must be reformulated since reds, lights, and darks cannot penetrate the minerals and oxidize faster, causing color fading quickly (e.g., within days) |
| Highlighted | Bright, shiny hair | Highlights lose vibrancy | Highlights begin to fade within days, constant breakage problems occur, and the hair has no shine |
| Permed | Desired volume, with results usually very good with little resistance | Crown is often resistant and loses curl formation prematurely | Hair is resistant to perm service, hair feels dry after perm, and perm fades quickly (curl is lost) |
| Changes to shampoo or hair product | Add oil, increase oil concentration and fat concentration (e.g., coconut oil), add conditioning substance | Increase soap or detergent level in shampoo, increase pH with acid (e.g., citric acid) | Significantly increase soap or detergent level in shampoo, significantly increase pH with acid (e.g., citric acid) |

Figure 4:
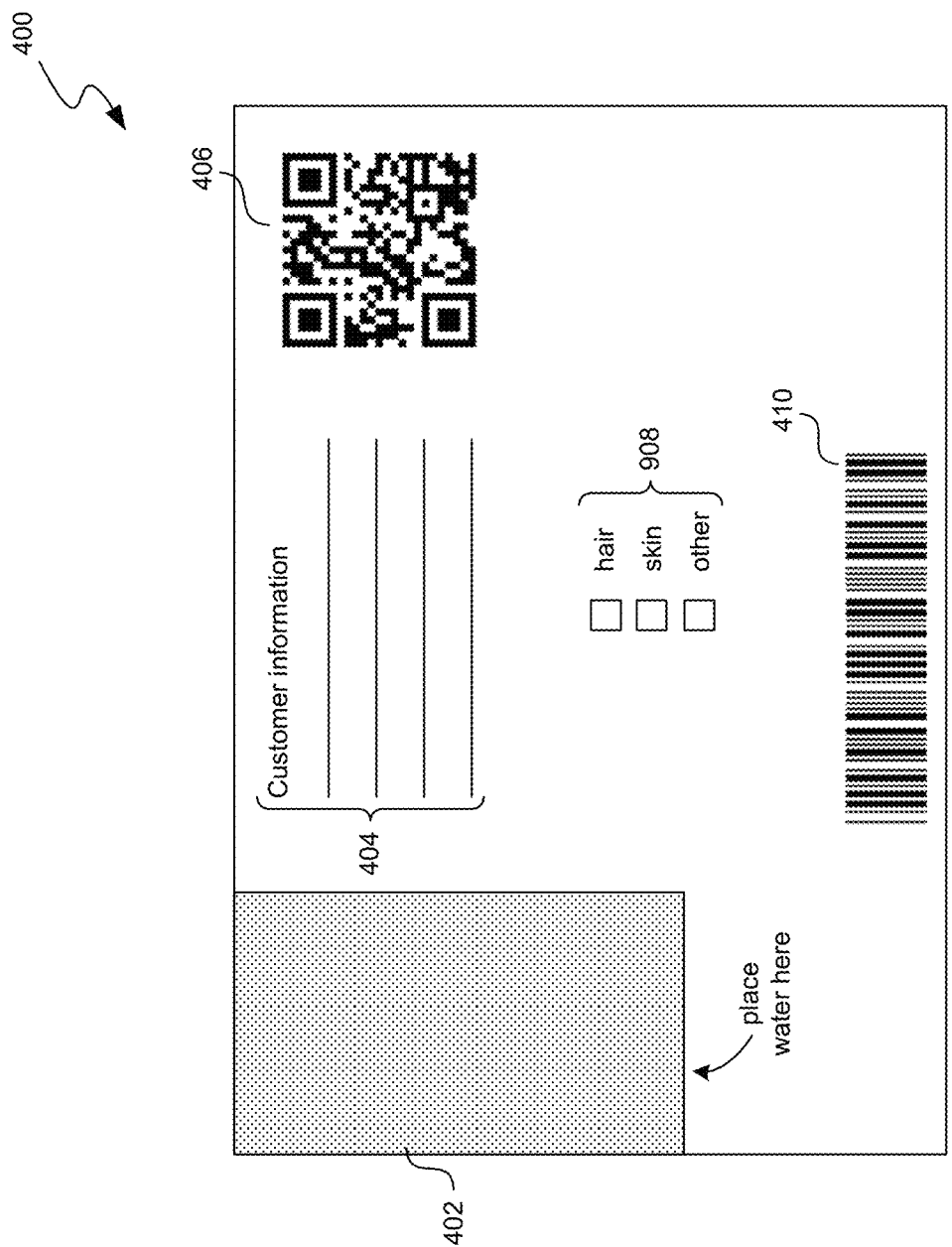
FIG. 4 illustrates an example of a water hardness testing paper used to test water hardness of a water source.

FIG. 4 illustrates an example of a water hardness testing paper that potential users of the customized care system 102 can use to test water hardness of a water source. The water hardness testing paper instructions may direct a user or potential customer to place a testing material 402 (e.g., litmus paper) in an area near the water intended for use during the care routine (e.g., a water source such as a shower, sink, or bathtub). For example, the user may place the testing material 402 under a faucet or showerhead. After adding water, per the promotional testing kit's instructions, the area of the testing material 402 exposed to the water may become a specific color (e.g., light pink to represent a certain pH value or concentration of magnesium). The user may report the resulting color or send a picture with the resulting color to the system. The user may also send the results to the company that provided the water hardness testing paper (e.g., a website). The water hardness testing paper testing kit may also function as a coupon or a promotion. The water hardness testing paper may include customer information 404, a bar code 410, a quick response (QR) code 406, and the like.

Figure 5:
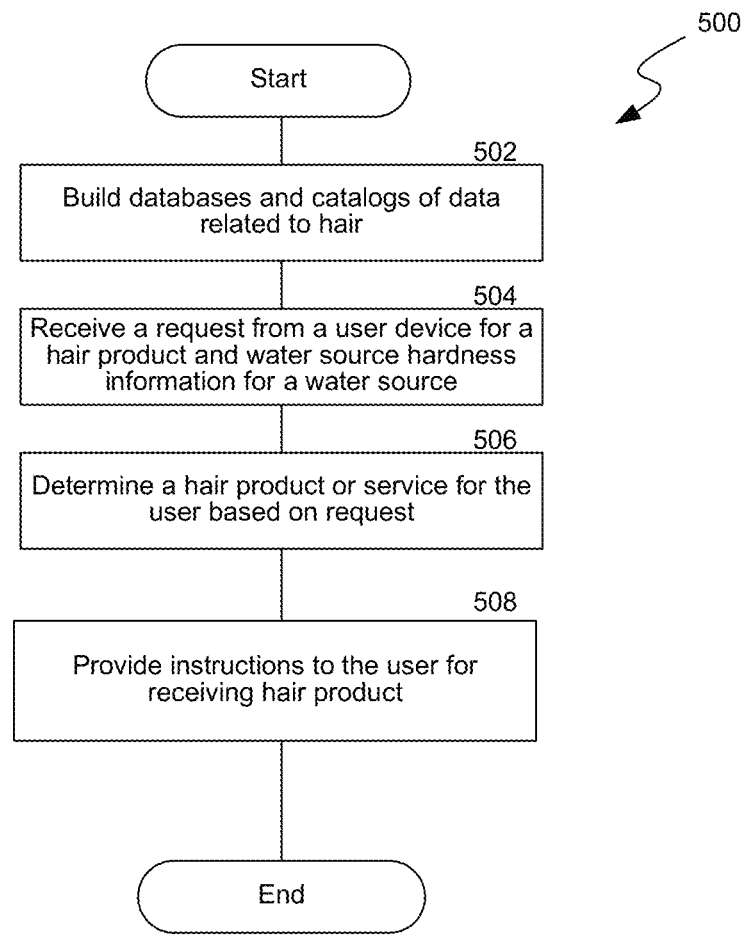
FIG. 5 illustrates an example process performed by the customized care system for recommending or providing a customized hair product.

FIG. 5 illustrates an example process 500 performed by the customized care system 102 of fulfilling requests from users for customized care products or services. At block 502, the system builds databases and catalogs of data related to hair and environmental conditions. The process 500 can be executed by the customized care system 102 or through a user's device such as user device 118 in FIG. 1. The process 500 can begin when a user is interested in receiving a hair product or when a company is interested in developing a hair product for a target market. The process 500 begins at block 502 and proceeds to block 504. At block 502, the system gathers information regarding hair products and catalogs with hair products. The data can include the hair product name, chemical formula, expected results of using the hair product, and ranges of water hardness.

At block 504, the system receives a request from a user device for a hair product and water source hardness information. A request for a hair product can be a general request for a hair product that improves user's hair appearance and/or health. Alternatively, a request for a hair product can be a request for a hair product that protects against damage to hair based on water hardness levels in a water source used in combination with a hair product. Water source hardness information can supplied by the user or derived from information the user provides. More details regarding the water hardness or a water source are described with respect to process 600.

At block 506, the system determines a hair product or service for the user based on water hardness. In some embodiments, the system sends instructions to a hair product manufacturer to adjust the chemical composition of the hair product to meet the user's goals. For example, depending on the hardness of the user's or potential customer's water, the system can send instructions to a hair product manufacture to vary levels of detergent and soap or mix other ingredients into a recommended shampoo to wash away the minerals. In high levels of hard water, soap reacts with calcium to form soap scum, and more soap will remove the scum. For example, more sodium hydroxide may be added to a shampoo's composition if the shampoo is intended for use in a hard-water environment. The system can determine an a hair product or service for the user by filtering a database of hair products based on the chemical formula of the hair product and water hardness of the water source.

Furthermore, other factors can affect the water chemistry, such as where there is a water filtration system in use (e.g., comparing a new home, a hotel, or an old building with rusty pipes and no filtration). For example, $Ca(OH)_2$ can be added to hard water. The $Ca(OH)_2$, or "slaked lime," raises the pH of the water and causes the calcium and magnesium to precipitate (solidify) into calcium carbonate ($CaCO_3$) and magnesium hydroxide ($Mg(OH)_2$). These precipitates can then be easily washed out with a detergent or soap due to their insolubility in water. One with ordinary skill in the art will appreciate how to add or reduce the amount of chemical stabilizers, preservatives, vitamins, seaweed, corn, oatmeal, pumice, aloe, extract, oils, beeswax, and herbs to react with positive cations like $Mg^{+2}$ and $Ca^{+2}$ in hard water. Furthermore, acid (e.g., citric acid or salicylic acid) may be added to balance the pH of a shampoo for a desired effect. The following is a list of chemicals that may be used in various concentrations in hair products to address water hardness issues: sodium laureth sulfate, sodium lauryl sulfate, and/or chelation agents. Some general water hardness equations will be used by the system to calculate the appropriate amount of chemicals to add to a solution to counteract or balance water hardness effects:

$$CaCO_3(s)+CO_2(aq)+H_2O \leftrightarrows Ca^{+2}(aq)+2HCO_3^-(aq) \quad (1)$$

$$CaCO_3(s) \leftrightarrows Ca^{+2}(aq)+CO_2^{-3}(aq) \quad (2)$$

$$2(C_{18}H_{35}O_2)^{-2}(aq)+Mg^{+2}(aq) \leftrightarrows Mg(C_{18}H_{35}O_2)_2(s) \quad (3)$$

$$Mg(OH)_2^+(s) \leftrightarrows Mg^{+2}(aq)+2(OH)^{-1}(aq) \quad (4)$$

At block 508, the system provides instructions to the user receiving hair product. Once the system has determining a hair product, the system can send the user instructions or ordering the hair product (e.g., via an online store). Alternatively, the system can recommend hair products to a user. For example, the system can select hair products from a database that match the user's preferences and level of water hardness for water source used by the customer.

Figure 6A:
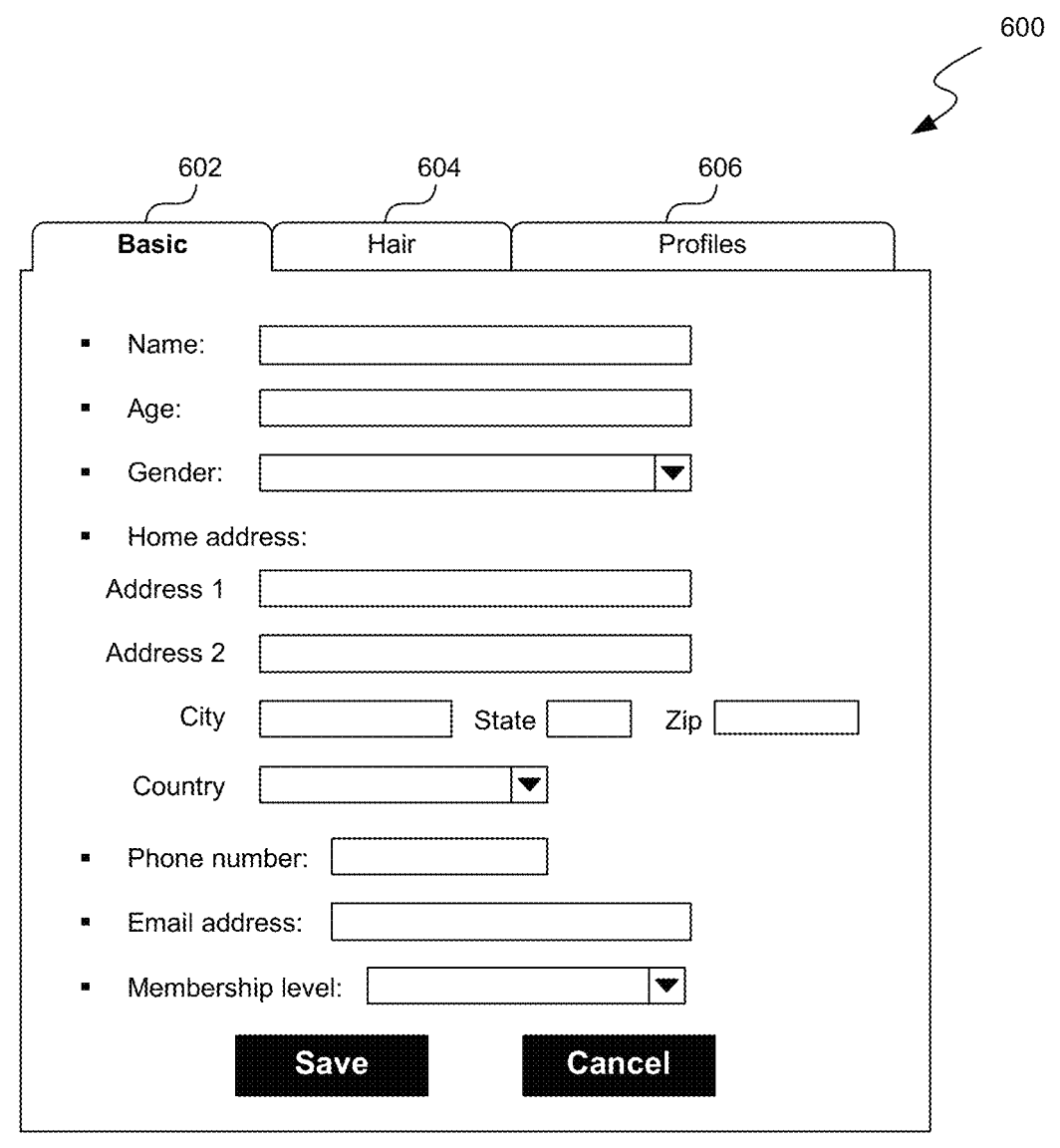

FIGS. 6A-6C illustrate example GUI screens presented by the customized care system 102 for interacting with users. FIG. 6A illustrates an example screen for inputting basic user information 602, including a choice of membership level associated with a specific set of products and services. For example, a higher membership level can be associated with more options for customization and more recommendations. FIG. 6B illustrates an example screen 750 for inputting hair-related user information 604. The user can specify default desired hair effects (not limited to any time or location), along with the user's current hair regime, and default vendors for hair products and services. FIG. 6C illustrates an example screen 775 for managing user profiles 606, each corresponding to a stay at a certain destination for a certain duration. The user can simply supply an address, or the user can further supply water samples or corresponding water test results, request a water testing kit, and/or indicate desired hair effects for the destination (including an "Others" box in which the user can input desired hair effects other than those already listed). The user can also specify delivery details for the customized hair solutions, including a delivery date and a preferred delivery method. In addition, the system allows the user to build multiple profiles using a "New profile" button, and to search existing profiles, using a "Search profile" text box 770. The system can also include in the GUI various features that allow users to access hair reports and recommendations, share profiles or hair instructions, browse or comment on specific hair products or services, and otherwise allow users to socialize during the customized care management process.

FIG. 7 illustrates an example hair report produced by the customized care system for a user in response to the user's request for hair solutions. The report includes an analysis of the user's hair condition in terms of various characteristics. The report can also include an analysis of a time and location of use in terms of associated hair effects. The report further includes a list of desirable hair effects for the user and the specified time and location. Furthermore, the report describes the hair solutions specifically recommended for the user and the specified time and location. The hair solutions can include recommended products or services. The recommended products can include custom-made products and/or products available in stores. The description of the hair solutions in the report generally also includes instructions on how to obtain or use the recommended products or services (not shown in figure). The reports can be transmitted to the user's device separately, accessed from existing GUIs, or directly transmitted to specific vendor systems of the user's choice.

Figure 8:
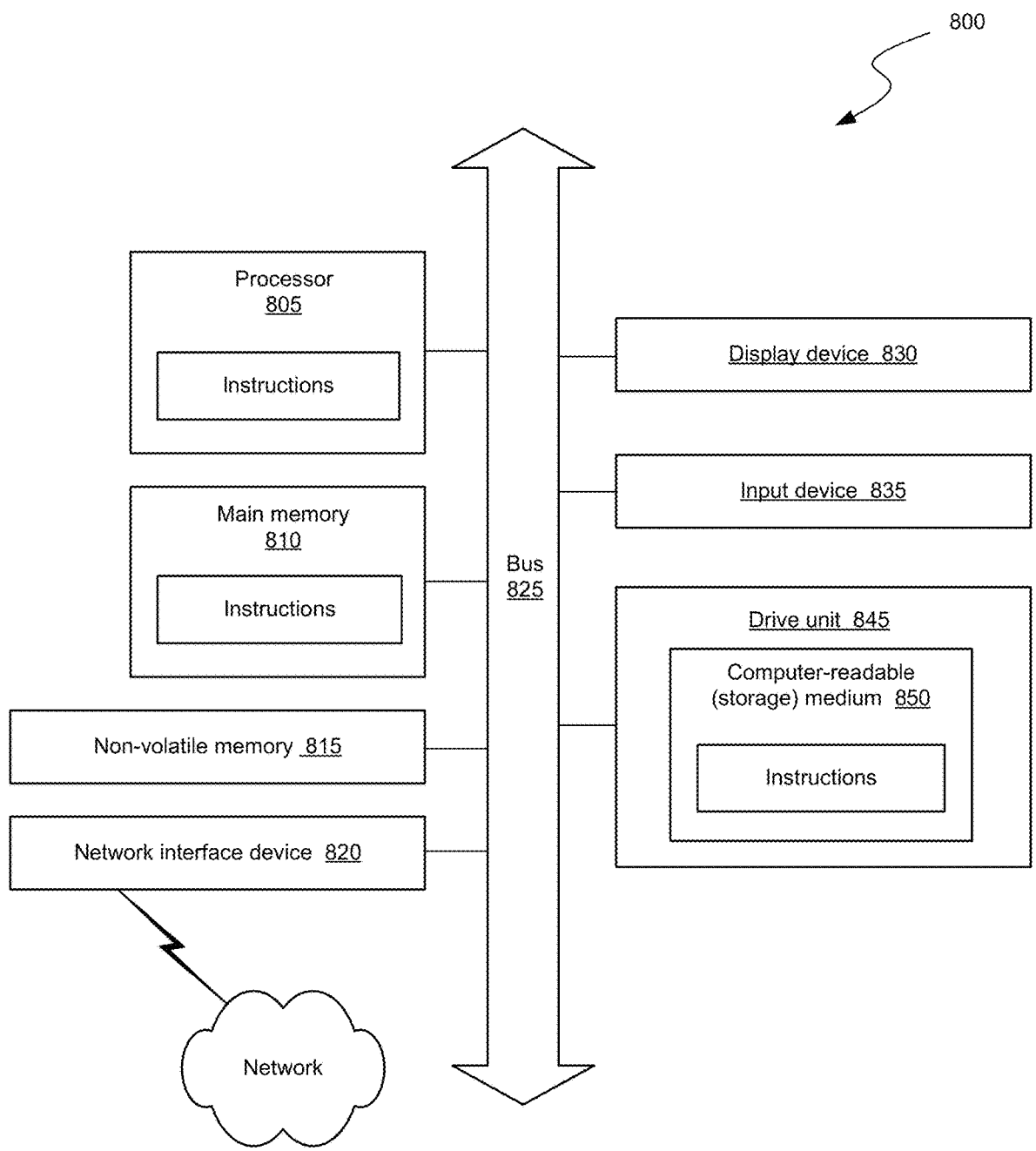
FIG. 8 shows a diagrammatic representation of a computer system on which the embodiments of the present disclosure can be implemented.

FIG. 8 shows a diagrammatic representation of a computer system 800 on which the embodiments of the present disclosure can be implemented. The computer system 800 generally includes a processor 805, main memory 810, non-volatile memory 1015, and a network interface device 820. Various common components (e.g., cache memory) are omitted for illustrative simplicity. The computer system 800 is intended to illustrate a hardware device on which any of the components and methods described above can be implemented. The computer system 800 can be of any applicable known or convenient type. The components of the computer system 800 can be coupled together via a bus 1025 or through some other known or convenient device.

The processor 805 may be, for example, a conventional microprocessor such as an Intel® Pentium® microprocessor or Motorola PowerPC™ microprocessor. One of skill in the relevant art will recognize that the terms "computer system-readable (storage) medium" or "computer-readable (storage) medium" include any type of device that is accessible by the processor.

The main memory 810 is coupled to the processor 805 by, for example, a bus 1025, such as a PCI bus, SCSI bus, or the like. The main memory 810 can include, by way of example but not limitation, random access memory (RAM), such as dynamic RAM (DRAM) and static RAM (SRAM). The main memory 810 can be local, remote, or distributed.

The bus 825 also couples the processor 805 to the non-volatile memory 815 and drive unit 845. The non-volatile memory 815 is often a magnetic floppy or hard disk, a magnetic-optical disk, an optical disk, a read-only memory (ROM), such as a CD-ROM, EPROM, or EEPROM, a magnetic or optical card, an SD card, or another form of storage for large amounts of data. Some of this data is often written, by a direct memory access process, into memory during execution of software in the computer system 800. The non-volatile memory 815 can be local, remote, or distributed. The non-volatile memory 815 can be optional because systems can be created with all applicable data available in memory. A typical computer system will usually include at least a processor, memory, and a device (e.g., a bus) coupling the memory to the processor.

Software is typically stored in the non-volatile memory 815 and/or the drive unit 845. Indeed, for large programs, it may not even be possible to store the entire program in the memory. Nevertheless, it should be understood that, for software to run, it is moved, if necessary, to a computer-readable location appropriate for processing, and, for illustrative purposes, that location is referred to as the main memory 810 in this disclosure. Even when software is moved to the memory for execution, the processor will typically make use of hardware registers to store values associated with the software and the local cache. Ideally, this use serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus 825 also couples the processor to the network interface device 820. The interface can include one or more of a modem or network interface. It will be appreciated that a modem or network interface can be considered to be part of the computer system 800. The interface can include an analog modem, ISDN modem, cable modem, token ring interface, satellite transmission interface (e.g., "direct PC"), or other interfaces for coupling a computer system to other computer systems. The network interface device 820 can include one or more input and/or output devices 835. The input/output (I/O) devices 835 can include, by way of example but not limitation, a keyboard, a mouse or other pointing device, disk drives, printers, a scanner, speakers, DVD/CD-ROM drives, disk drives, and other I/O devices, including a display device. A display device 830 can include, by way of example but not limitation, a cathode ray tube (CRT), a liquid crystal display (LCD), a light-emitting diode (LED) display, a projected display (such as a heads-up display device), a touchscreen or some other applicable known or convenient display device. The display device 830 can be used to display text and graphics. For simplicity, it is assumed that controllers of any component not depicted in the example of FIG. 2 reside in the interface.

In operation, the computer system 800 can be controlled by operating system software that includes a file management system such as a disk operating system. One example of operating system software with associated file management system software is the Windows® family of operating systems from Microsoft Corporation and their associated file management systems. Another example of operating system software with its associated file management system software is the Linux™ operating system and its associated file management system. The file management system is typically stored in the non-volatile memory 815 and/or drive unit 1045 and causes the processor 805 to execute the various acts required by the operating system to input and output data and to store data in the memory, including storing files on the non-volatile memory 815 and/or drive unit 845.

From the foregoing, it will be appreciated that specific embodiments of the invention have been described herein for purposes of illustration, but that various modifications may be made without deviating from the scope of the invention. Those skilled in the art will appreciate that the actual implementation of the data storage area may take a variety of forms, and the phrase "data storage" or "database" is used herein in the generic sense to refer to any area that allows data to be stored in a structured and accessible fashion using such applications or constructs as databases, tables, linked lists, arrays, and so on. Those skilled in the art will further appreciate that the depicted flow charts may be altered in a variety of ways. For example, the order of the steps may be rearranged, steps may be performed in parallel, steps may be omitted, or other steps may be included. Accordingly, the invention is not limited except as by the appended claims.

I claim:

1. A method for recommending a hair product, the method comprising:
   maintaining a first dataset characterizing multiple hair products, the first dataset including an identifier and water hardness reaction characteristic for each of the multiple hair products;
   maintaining a second dataset characterizing an expected effect of physically combining each of the multiple hair products with a hair type and water hardness level;
   receiving user data characterizing a user, the user data comprising user hair type, user location information, and user desired hair appearance;
   receiving an image of a used water hardness test paper, wherein the water hardness test paper includes a reaction region and a test paper identifier;

based on the received image, identifying a color or wavelength of light associated with the used water hardness test paper;
based on the identifying the color or the wavelength of light associated with the used water hardness test paper, determining a level of water hardness of a water source;
identifying one or more of the multiple hair products configured to mitigate the water hardness effects of the water source;
filtering the identified plurality of hair products based on one or more factors to generate a recommended set of hair products;
providing a recommended set of hair products to a user based on the filtered set; and
adjusting, by a manufacturer, the chemical composition of at least one of the identified plurality of hair products for the user based on the level of water hardness of a water source;
wherein determining a level of water hardness of a water source further comprises:
determine water hardness based on government water hardness data and user inputs;
wherein the water hardness testing paper comprises customer information, a bar code, and a QR code;
wherein government water hardness data is received from at least one of local, city, and regional governments; and
wherein the user inputs include at least one of well water source and rusty pipes water source.

2. The method of claim 1, wherein the user location information is based on a location of the user's mobile device and is received from a roaming platform capable of adding and removing digits to communications between the home communications network and the roaming communications network, and wherein the digits at least partially indicate a location of the mobile device.

3. The method of claim 1, wherein the water hardness reaction characteristic is a concentration of ions in the water source.

4. At least one non-transitory computer-readable medium, carrying instructions that, when performed by at least one data processor, perform operations for determining a recommended hair product, the operations comprising:
maintaining a first dataset characterizing multiple hair products, the first dataset including an identifier and water hardness reaction characteristic for each of the multiple hair products;
maintaining a second dataset characterizing an expected effect of physically combining each of the multiple hair products with a hair type and water hardness level;
receiving user data characterizing a user, the user data comprising user hair type, user location information, and user desired hair appearance;
receiving an image of a used water hardness test paper, wherein the water hardness test paper includes a reaction region and a test paper identifier;
based on the received image, identifying a color or wavelength of light associated with the used water hardness test paper;
based on the identifying the color or the wavelength of light associated with the used water hardness test paper, determining a level of water hardness of a water source;
identifying one or more of the multiple hair products configured to mitigate the water hardness effects of the water source;
filtering the identified plurality of hair products based on one or more factors to generate a recommended set of hair products;
providing a recommended set of hair products to a user based on the filtered set; and
adjusting, by a manufacturer, the chemical composition of at least one of the identified plurality of hair products for the user based on the level of water hardness of a water source;
wherein determining a level of water hardness of a water source further comprises:
determine water hardness based on government water hardness data and user inputs;
wherein the water hardness testing paper comprises customer information, a bar code, and a QR code;
wherein government water hardness data is received from at least one of local, city, and regional governments; and
wherein the user inputs include at least one of well water source and rusty pipes water source.

5. The at least one non-transitory computer-readable medium of claim 4, wherein the user location information is based on a location of the user's mobile device and is received from a roaming platform capable of adding and removing digits to communications between the home communications network and the roaming communications network, and wherein the digits at least partially indicate a location of the mobile device.

6. The at least one non-transitory computer-readable medium of claim 4, wherein the water hardness reaction characteristic is a concentration of ions in the water source.

* * * * *